(12) United States Patent
Jeong et al.

(10) Patent No.: US 7,777,973 B2
(45) Date of Patent: Aug. 17, 2010

(54) SUBMINIATURE IMAGING OPTICAL SYSTEM

(75) Inventors: Jae Cheol Jeong, Gyunggi-do (KR); Chul Yeub Han, Gyunggi-do (KR); Young Gi Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 16 days.

(21) Appl. No.: 12/003,949

(22) Filed: Jan. 3, 2008

(65) Prior Publication Data

US 2008/0186594 A1    Aug. 7, 2008

(30) Foreign Application Priority Data

Feb. 6, 2007    (KR) .................... 10-2007-0012011

(51) Int. Cl.
  *G02B 9/36*    (2006.01)
  *G02B 13/18*   (2006.01)
  *G02B 3/02*    (2006.01)
(52) U.S. Cl. ...................... 359/775; 359/715
(58) Field of Classification Search ................ 359/715, 359/775, 688
  See application file for complete search history.

(56) References Cited

U.S. PATENT DOCUMENTS 4,948,236 A    8/1990  Hirano
5,825,556 A *  10/1998 Meyers ........................ 359/690
7,027,236 B2 * 4/2006  Nishina ........................ 359/775
2007/0008625 A1  1/2007 Park et al.
2007/0188890 A1  8/2007 Jo et al.

FOREIGN PATENT DOCUMENTS

KR    2001-0082865    8/2001

OTHER PUBLICATIONS

Korean Patent Office Action, mailed Jan. 31, 2008 and issued in corresponding Korean Patent Application No. 10-2007-0012011.
Combined Search and Examination Report issued May 14, 2008 in corresponding UK Patent Application No. GB0800577.9.
Chinese Office Action issued on Mar. 20, 2009 in corresponding Chinese Office Action 200810004145.3.

* cited by examiner

*Primary Examiner*—Alicia M Harrington (57) ABSTRACT

A subminiature imaging optical system including: first, second, third and fourth lenses sequentially positioned from an object side to an image side, the first lens having positive refractivity, the second lens having a concave image-side surface and having negative refractivity, the third lens having negative refractivity, and the fourth lens having positive refractivity, wherein the second lens satisfies following condition 1, and the third lens satisfies following condition 2, $$20 < V2 < 50 \quad \text{condition 1,}$$

$$20 < V3 < 50 \quad \text{condition 2,}$$

where V2 is an Abbe number of the second lens and V3 is an Abbe number of the third lens.

3 Claims, 8 Drawing Sheets

SUBMINIATURE IMAGING OPTICAL SYSTEM

CROSS-REFERENCE TO RELATED APPLICATIONS

This application claims the priority of Korean Patent Application No. 2007-12011 filed on Feb. 6, 2007, in the Korean Intellectual Property Office, the disclosure of which is incorporated herein by reference.

BACKGROUND OF THE INVENTION

1. Field of the Invention

The present invention relates to a subminiature imaging optical system, and more particularly, to a subminiature imaging optical system installed in a mobile telecommunication terminal or a personal digital assistant (PDA), or used in a surveillance camera or a digital camera.

2. Description of the Related Art

Recently, regarding an image pickup system, studies have been conducted on camera modules for telecommunication terminals, digital still cameras (DSCs), camcorders, and personal computer (PC) cameras which are attached to personal computers an imaging device. Here, an image-forming lens system is the most important component of such an image pickup system to obtain an image.

The lens system needs to be high-performing in terms of resolution and image quality, thus complicating a lens configuration. However, such structural and optical complexity leads to increase in size, posing a difficulty to compactness and thinness of the lens system.

For example, a camera module should necessarily be miniaturized to be installed in a mobile phone more efficiently. Also, a charge coupled device (CCD) or a complementary metal oxide semiconductor (CMOS) used in the camera module as an image sensor is gradually increased in resolution and reduced in pixel size. In turn, the lens system included in the camera module needs to be smaller-sized and thinner while attaining high resolution and superior optical capabilities.

Here, in a case where the CCD or CMOS with 3 million pixels is employed, only three sheets of lenses or less may be arranged to satisfy optical capabilities and miniaturization. However, in a case where three sheets of lenses or less are applied to a high-resolution imaging device such as the CCD or CMOS with at least 5 million pixels, each of the lenses should be increased in refractivity, and thus is hard to be machined. This as a result renders it difficult to achieve both high performance and miniaturization of the lens system. Thus, four sheets of lenses may be employed, but when a spherical lens is utilized in this configuration, the optical lens system is increased in total length, thereby hardly miniaturizable.

Therefore there has been a demand for a lens system for a camera module which can be subminiaturized and realize optical capabilities.

SUMMARY OF THE INVENTION

An aspect of the present invention provides a subminiature lens system for a camera module which adopts only four sheets of lenses to achieve high resolution and subminiaturization, while performing with excellent optical capabilities.

An aspect of the present invention also provides a lighter subminiature lens system for a camera module which employs at least three sheets of plastic lenses thereby to be manufactured in mass production at a low cost.

According to an aspect of the present invention, there is provided a subminiature imaging optical system including: first, second, third and fourth lenses sequentially positioned from an object side to an image plane side, the first lens having positive refractivity, the second lens having a concave image-side surface and having negative refractivity, the third lens having negative refractivity, and the fourth lens having positive refractivity, wherein the second lens satisfies following condition 1, and the third lens satisfies following condition 2, $$20 < V2 < 50 \quad \text{condition 1,}$$

$$20 < V3 < 50 \quad \text{condition 2,}$$

where $V2$ is an Abbe number of the second lens and $V3$ is an Abbe number of the third lens.

At least one of respective surfaces of the first, third and fourth lenses may be formed of an aspherical surface.

The first, second and third lenses may be formed of plastic and the second lens may be formed of glass. The first to fourth lenses may be formed of plastic.

An aperture stop may be disposed in front of an object-side surface of the first lens.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
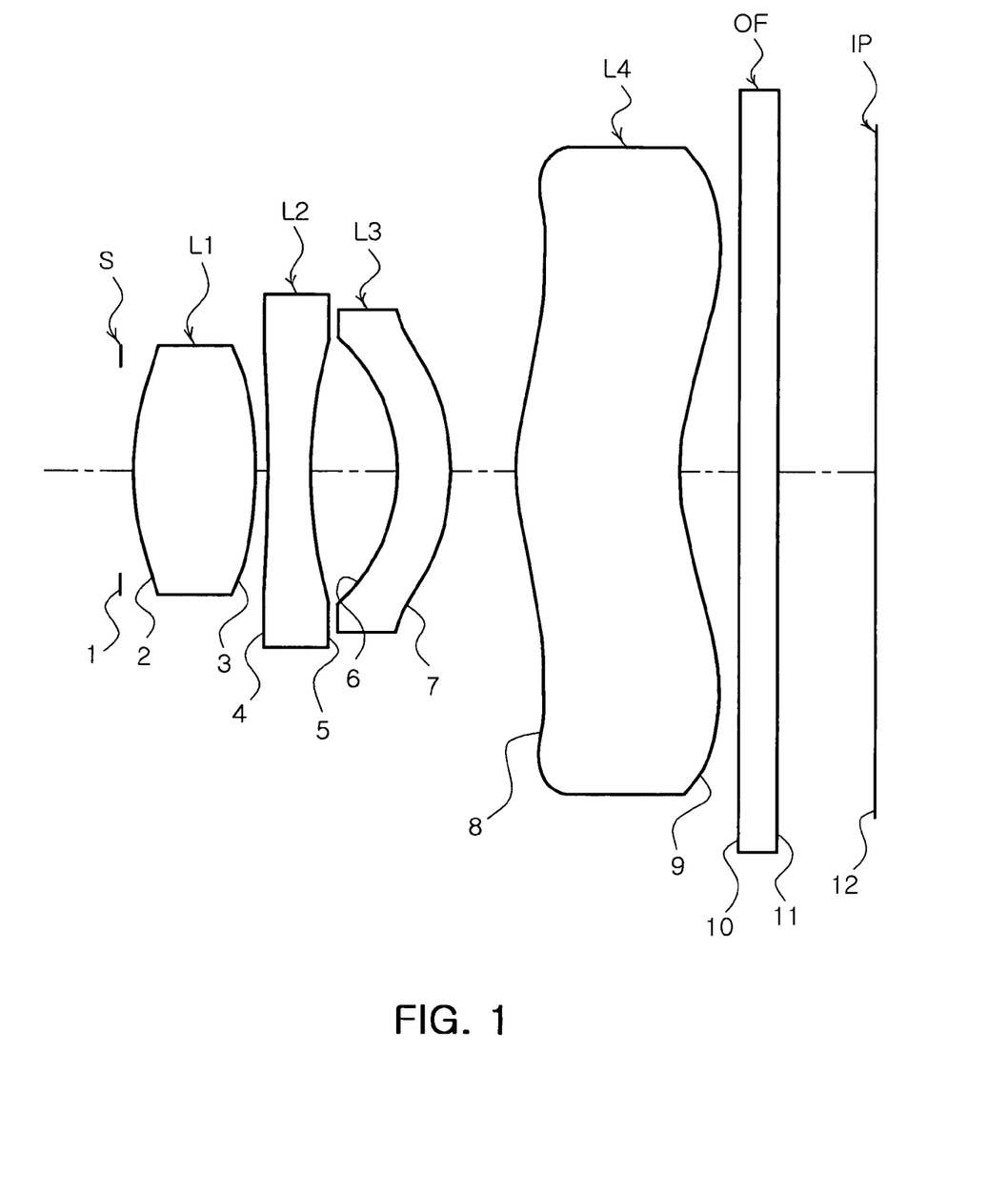
FIG. 1 is a lens configuration view illustrating a subminiature imaging optical system according to a first embodiment of the invention.

FIG. 1 is a lens configuration view illustrating a subminiature imaging optical system according to a first embodiment of the invention. In the following lens configuration views, the thicknesses, sizes and shapes of the lenses may be exaggerated for clarity. In particular, the shapes of spherical or aspherical surfaces shown in the views are only exemplary and should not be construed as limiting.

In general, a camera module includes at least one lens, a housing having an inner space for housing the lens therein, an image sensor corresponding to an imaging surface formed by the lenses, and a circuit board fixedly installed at another end of the housing and having the image sensor disposed on one surface thereof to process an image sensed by the image sensor.

The present invention provides a subminiature imaging optical system for use in a subminiature camera module.

As shown in FIG. 1, the subminiature imaging optical system includes a first lens L1 having positive refractivity, a second lens L2 having a concave image-side surface and having negative refractivity, a third lens L3 having negative refractivity, a fourth lens L4 having positive refractivity and an aperture stop S disposed in front of an object-side surface of the first lens L1. At least one of respective surfaces of the first, third and fourth lenses L1, L3, and L4 may be formed of an aspherical surface.

Here, at least three of the first to fourth lenses L1 to L4 may be formed of plastic. Particularly, the first, third and fourth lenses L1, L3, and L4 having the aspherical surface, respectively may be formed of plastic and the second lens L2 may be formed of glass. Alternatively, the first to fourth lenses L1 to L4 may be formed of plastic. This ensures a smaller and lighter optical system to be manufactured in mass production at a lower cost. Notably, the lenses formed of aspherical surfaces are improved in resolution and reduced in distortion and spherical aberration, thereby realizing a compact optical system excellent in optical properties.

Meanwhile, an optical filter such as an infrared ray filter, a cover glass and the like may be provided between the fourth lens LG4 and an image plane IP.

The image plane IP corresponds to an image sensor such as a charge coupled device (CCD) and a complementary metal oxide semiconductor (CMOS).

In addition, according to the present embodiment, the aperture stop is located in front of the object-side of the first lens L1. Thus the first lens L1 is exposed in a smallest area to an object side, thereby ensuring less foreign materials to infiltrate thereinto. Also, an angle of view starts from a point close to an upper peripheral portion of the lens, thereby leading to a smaller-sized window of an external instrument for fixing the camera module. Moreover, to attain higher resolution, the image sensor is further decreased in pixel size, accordingly requiring a brighter optical system (lens with a small F number). The aperture stop located in the front of the object side assures the bright optical system to be easily manufactured.

With this overall configuration, operational effects of following conditions 1 and 2 will be examined hereunder.

$$20 < V2 < 50 \quad \text{condition 1}$$

$$20 < V3 < 50 \quad \text{condition 2}$$

wherein V2 denotes an Abbe number of the second lens L2 and V3 denotes an Abbe number of the third lens L3.

Condition 1 prescribes the Abbe number of the second lens L2 and condition 2 prescribes the Abbe number of the third lens L3.

An optical material can be largely broken down into two types. One is a crown material having an Abbe number of at least 50 and the other is a flint material having an Abbe number less than 50. Here, the flint type of optical material, which has an Abbe number less than 50, is greatly chromatically dispersed. According to the present embodiment, the second and third lenses L2 and L3 positioned second and third from the object side are formed of the flint material to have negative refractivity, thereby improving chromatic aberration. Moreover, out of known existing optical materials, none has an Abbe number of 20 or less.

Now, the present invention will be examined in greater detail through specific numerical examples.

As described above, in the following first and second embodiments, a subminiature imaging optical system includes a first lens L1 having positive refractivity, a second lens L2 having a concave image-side surface and having negative refractivity, a third lens L3 having negative refractivity, a fourth lens L4 having positive refractivity and an aperture stop S disposed in front of an object-side surface of the first lens L1. Also, an optical filter such as an infrared ray filter, a cover glass and the like may be provided between the fourth lens LG4 and an image plane IP. The image plane IP corresponds to an image sensor such as the CCD and CMOS.

Each of the aspherical surfaces used in each of the embodiments herein is obtained from following Equation 1:

$$Z = \frac{cY^2}{1 + \sqrt{1 - (1+K)c^2 Y^2}} + AY^4 + BY^6 + CY^8 + DY^{10} + EY^{12} + FY^{14} + \ldots, \quad \text{Equation 1}$$

where Z is a distance from a vertex of a lens in an optical axis, Y is a distance in a direction perpendicular to the optical axis, C is a reciprocal number of a radius r of curvature at a vertex of the lens, K is a conic constant and A, B, C, D, E and F are aspherical coefficients.

Here, the MTF depends on a spatial frequency of a cycle per millimeter and is defined by the following Equation 2 between a maximum intensity and a minimum intensity of light.

$$MTF = \frac{\text{Max} - \text{Min}}{\text{Max} + \text{Min}} \quad \text{Equation 2}$$

That is, MTF is most ideal when 1 and a smaller MTF deteriorates a resolution.

First Embodiment

Figure 3:
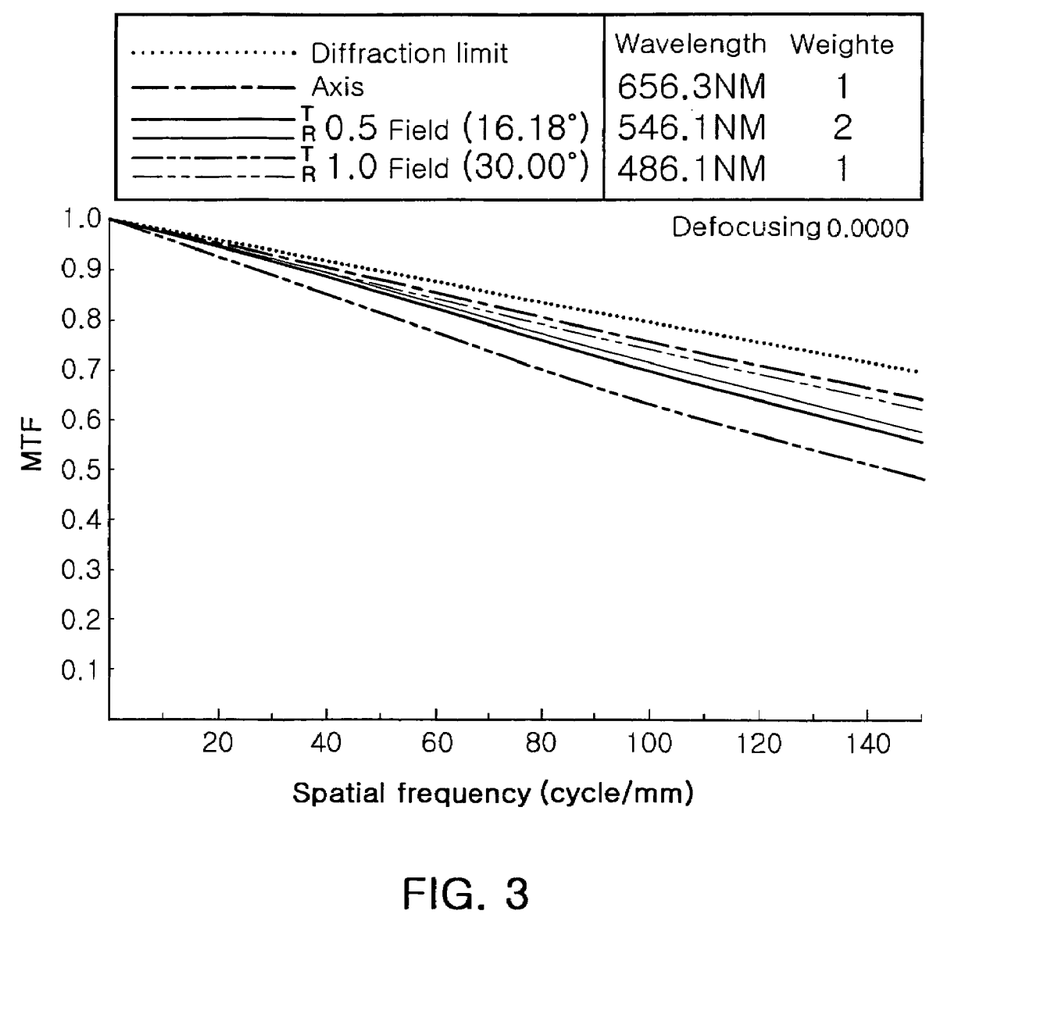
FIG. 3 is a graph illustrating modulation transfer function (MTF) characteristics of the embodiment shown in FIG. 1.
Figure 4:
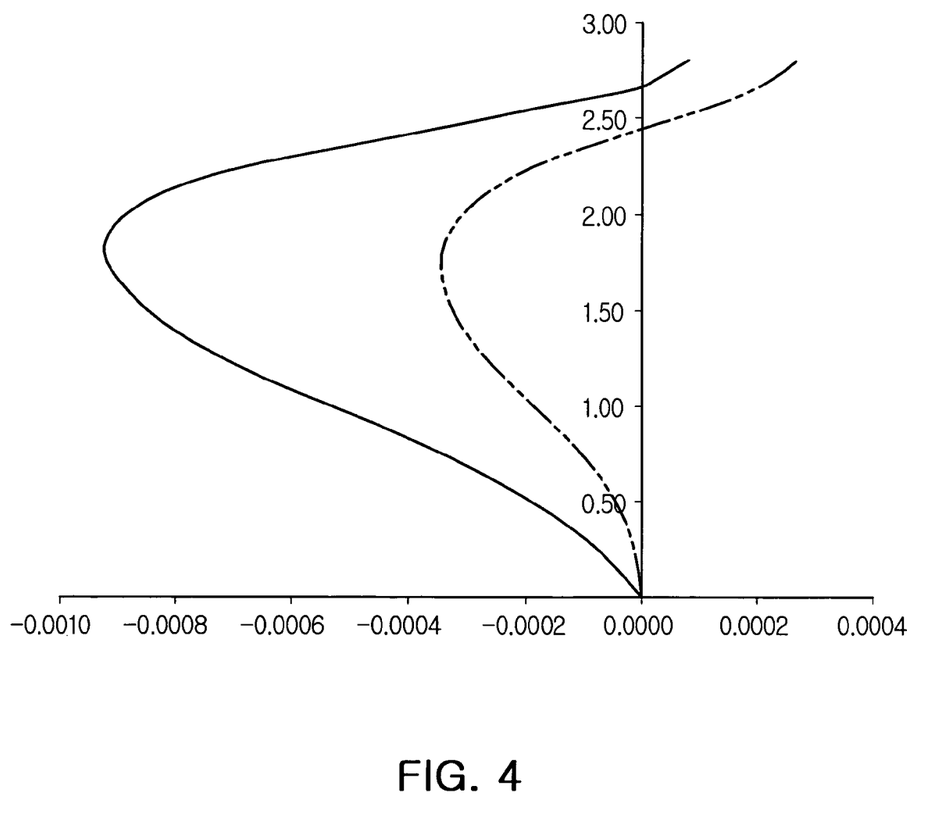
FIG. 4 illustrates lateral chromatic aberration of the embodiment shown in FIG. 1.

Table 1 below shows numerical values according to a first embodiment of the present invention. FIG. 1 is a view illustrating a lens arrangement of the subminiature imaging optical system according to the first embodiment of the present invention, and FIGS. 2A to 2C show aberrations of the embodiment shown in Table 1 and FIG. 1. FIG. 3 is a graph illustrating MTF characteristics shown in Table 1 and FIG. 1, and FIG. 4 shows chromatic aberration of the subminiature imaging optical system shown in Table 1 and FIG. 1.

In the first embodiment, an F number Fno is 2.85, an angle of view is 60 degrees, a total length TL from the object-side surface 2 of the first lens L1 to the image plane 12 is 5.95 mm, and an effective focal length f is 4.8 mm. Also, the first lens L1, the third lens L3 and the fourth lens L4 are formed of a plastic material and the second lens L2 is formed of a glass material.

TABLE 1

| Surface No. | Radius of curvature (R) | Thickness or distance (t) | Refractive index $N_d$ | Abbe number $V_d$ | Remark |
|---|---|---|---|---|---|
| 1 | ∞ | 0.100000 | | | Aperture stop |
| *2 | 2.15644 | 0.963121 | 1.53 | 55.6 | First lens |
| *3 | −3.86786 | 0.100000 | | | |
| 4 | −23.86737 | 0.341086 | 1.755 | 27.38 | Second lens |
| 5 | 4.27838 | 0.676298 | | | |
| *6 | −1.58816 | 0.410158 | 1.6127 | 27.3 | Third lens |
| *7 | −2.35679 | 0.524788 | | | |
| *8 | 1.85880 | 1.294468 | 1.53 | 55.6 | Fourth lens |
| *9 | 2.04959 | 0.458366 | | | |
| 10 | ∞ | 0.300000 | 1.517 | 64.2 | Optical filter |
| 11 | ∞ | 0.781682 | | | |
| 12 | ∞ | 0.000000 | | | Image plane |

In Table 1, * represents an aspherical surface, and in the first embodiment, refractive surfaces 2 and 3 of the first lens L1 at the object side and the image side, refractive surfaces 6 and 7 of the third lens L3 at the object side and the image plane side and refractive surfaces 8 and 9 of the fourth lens L4 at the object side and the image side are aspherical.

Values of aspherical coefficients in the first embodiment according to Equation 1 are noted in Table 2 below.

TABLE 2

| Surface No. | K | A | B | C | D | E |
|---|---|---|---|---|---|---|
| 2 | −0.062193 | −.162552E−01 | −.552733E−02 | −.251800E−01 | 0.276464E−01 | −.236928E−01 |
| 3 | 0.000000 | −.183882E−01 | −.754492E−02 | −.264668E−01 | 0.110351E−01 | −.551816E−02 |
| 6 | −0.468375 | −.625088E−01 | −.860660E−01 | 0.184654 | −.147045 | 0.529697E−01 |
| 7 | 0.680310 | −.146192 | 0.962949E−01 | −.306657E−01 | 0.180470E−01 | −.187781E−02 |
| 8 | −6.312525 | −.651373E−01 | 0.2011113E−01 | −.276819E−02 | 0.766500E−05 | 0.211259E−04 |
| 9 | −3.741125 | −.397781E−01 | 0.618371E−02 | −.497931E−03 | −.136965E−04 | 0.202135E−05 |

Second Embodiment

Figure 5:
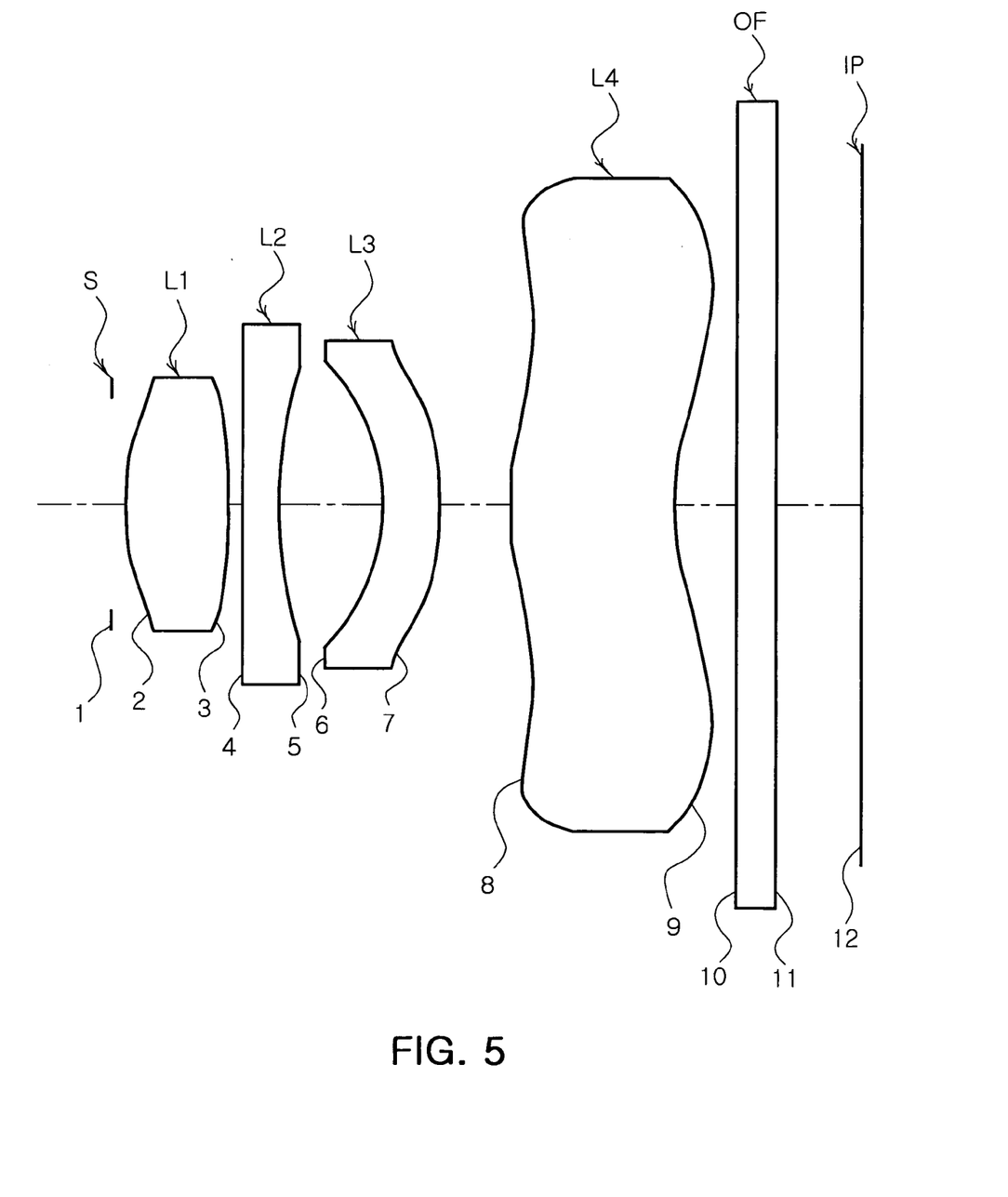
FIG. 5 is a lens configuration view illustrating a subminiature imaging optical system according to a second embodiment of the invention.
Figure 7:
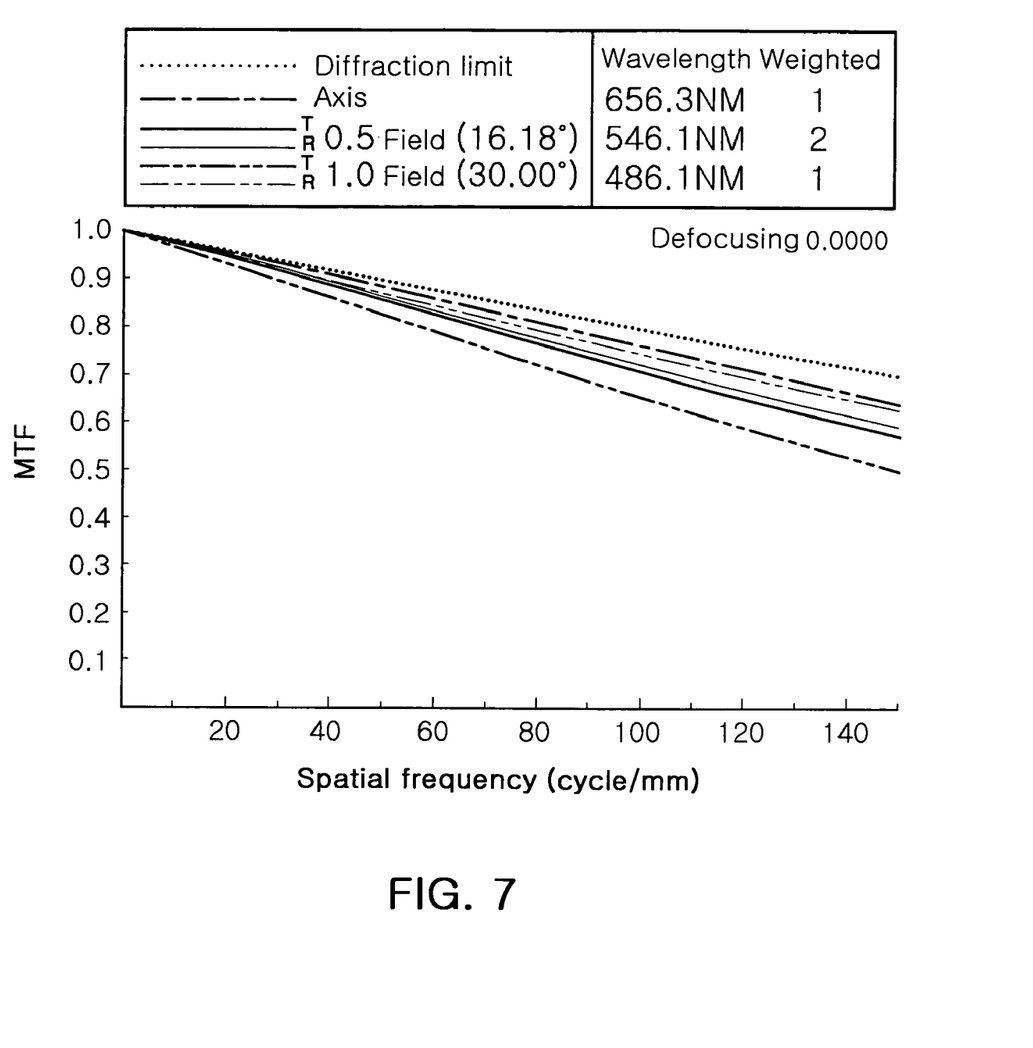
FIG. 7 is a graph illustrating modulation transfer function (MTF) characteristics of the embodiment shown in FIG. 4.
Figure 8:
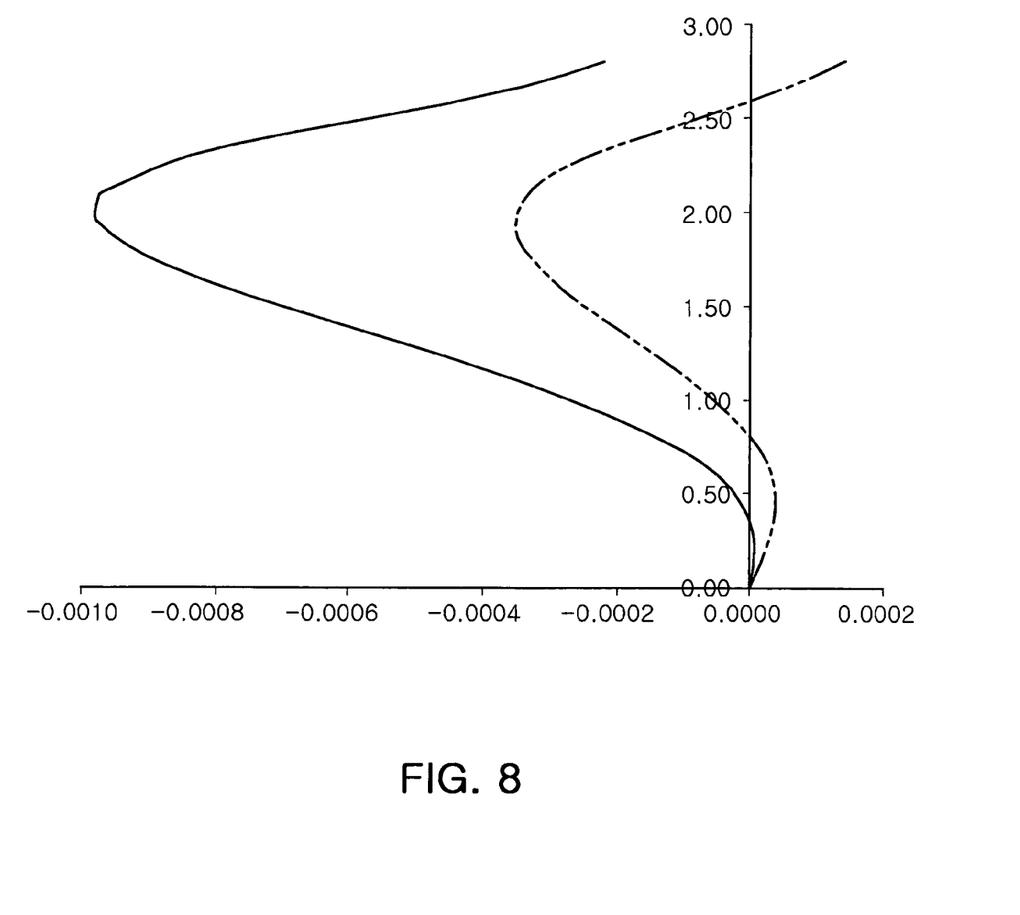
FIG. 8 illustrates lateral chromatic aberration of the embodiment shown in FIG. 5.

Table 3 below shows numerical values according to a second embodiment of the present invention. FIG. 5 is a view illustrating a lens arrangement of the subminiature imaging optical system according to the second embodiment of the present invention, and FIGS. 6A to 6C show aberrations of the embodiment shown in Table 3 and FIG. 4. FIG. 7 is a graph illustrating MTF characteristics shown in Table 3 and FIG. 5, and FIG. 8 shows chromatic aberration of the subminiature imaging optical system shown in Table 3 and FIG. 5.

In the second embodiment, an F number Fno is 2.8, an angle of view is 61.5 degrees, a total length TL from the object-side surface 2 of the first lens L1 to the image plane 12 is 5.83 mm, and an effective focal length f is 4.81 mm. Also, in the second embodiment, the first to fourth lenses L1 to L4 are formed of a plastic material.

TABLE 3

| Surface No. | Radius of curvature (R) | Thickness or distance (t) | Refractive index $N_d$ | Abbe number $V_d$ | Remark |
|---|---|---|---|---|---|
| 1 | ∞ | 0.100000 | | | Aperture stop |
| *2 | 2.06743 | 0.791628 | 1.53 | 55.6 | First lens |
| *3 | −6.86313 | 0.100000 | | | |
| 4 | 60.71127 | 0.292945 | 1.63898 | 23.42 | Second lens |
| 5 | 3.96951 | 0.795435 | | | |
| *6 | −2.07202 | 0.450870 | 1.6127 | 27.3 | Third lens |
| *7 | −3.37783 | 0.543693 | | | |
| *8 | 1.91572 | 1.271693 | 1.53 | 55.6 | Fourth lens |
| *9 | 2.03199 | 0.482887 | | | |
| 10 | ∞ | 0.300000 | 1.517 | 64.2 | Optical filter |
| 11 | ∞ | 0.700000 | | | |
| 12 | ∞ | 0.000000 | | | Image plane |

In Table 3, * represents an aspherical surface, and in the second embodiment, refractive surfaces 2 and 3 of the first lens L1 at the object side and the image side, refractive surfaces 6 and 7 of the third lens L3 at the object side and the image side and refractive surfaces 8 and 9 of the fourth lens L4 at the object side and the image side are aspherical.

Values of aspherical coefficients in the second embodiment according to Equation 1 are noted in Table 4 below.

TABLE 4

| Surface No. | K | A | B | C | D | E |
|---|---|---|---|---|---|---|
| 2 | 0.019324 | −.150962E−01 | −.344869E−02 | −.278714E−01 | 0.288479E−01 | −.229876E−01 |
| 3 | 0.000000 | −.186248E−01 | −.104370E−01 | −.230823E−01 | 0.116908E−01 | −.881911E−02 |
| 6 | −2.072020 | −.679264E−01 | −.992324E−01 | 0.184327 | −.141165 | 0.452324E−01 |
| 7 | −3.377830 | −.158237 | 0.945185E−01 | −.345190E−01 | 0.155615E−01 | −.128546E−02 |
| 8 | 1.915720 | −.779236E−01 | 0.222125E−01 | −.279536E−02 | −.132569E−04 | 0.250379E−04 |
| 9 | 2.031990 | −.364748E−01 | 0.535216E−02 | −.524543E−03 | 0.419584E−05 | 0.101173E−05 |

Figure 2:
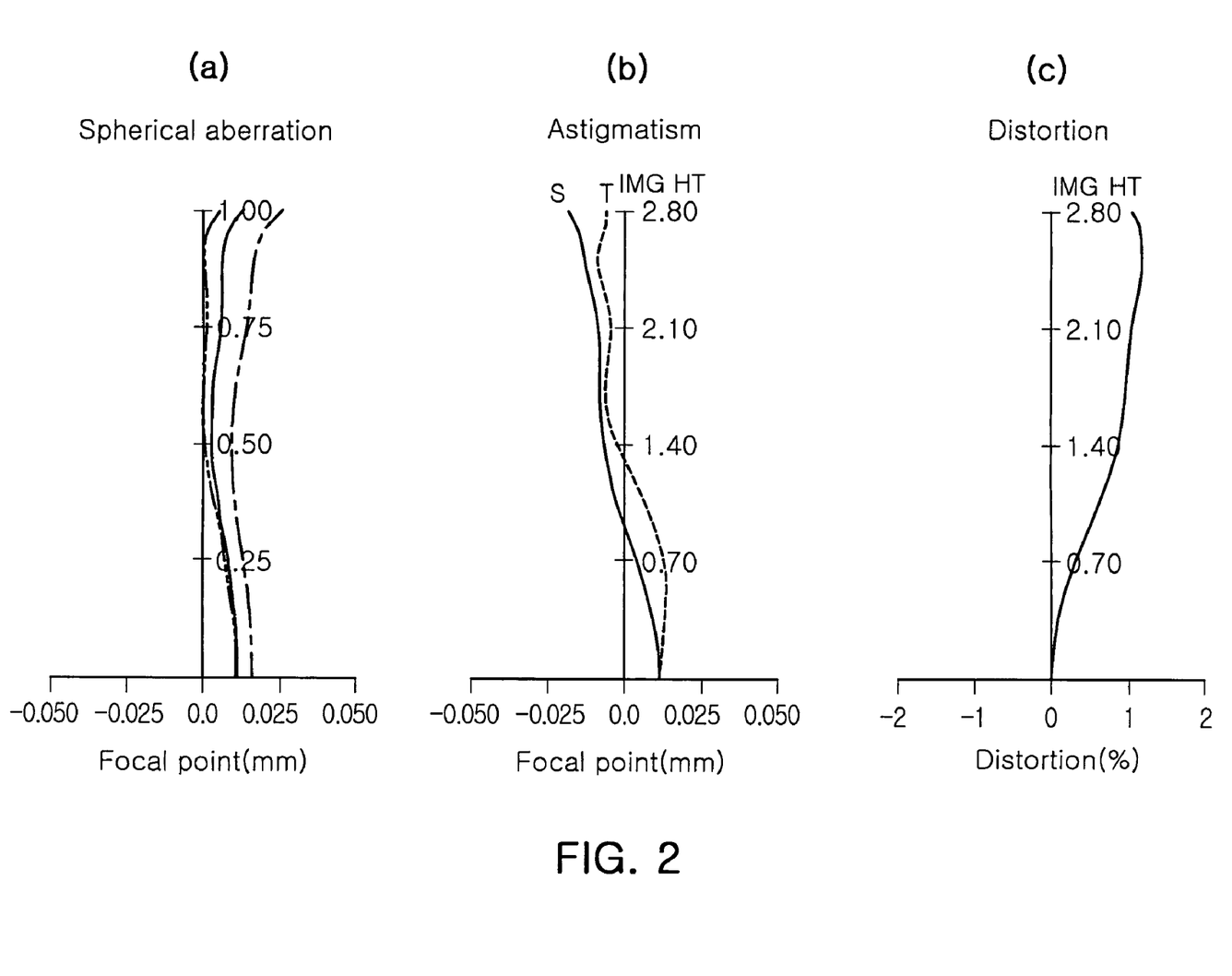
FIG. 2 is an aberrational diagram illustrating the embodiment shown in FIG. 2, in which A represents spherical aberration, B represents astigmatism and C represents distortion.
Figure 6:
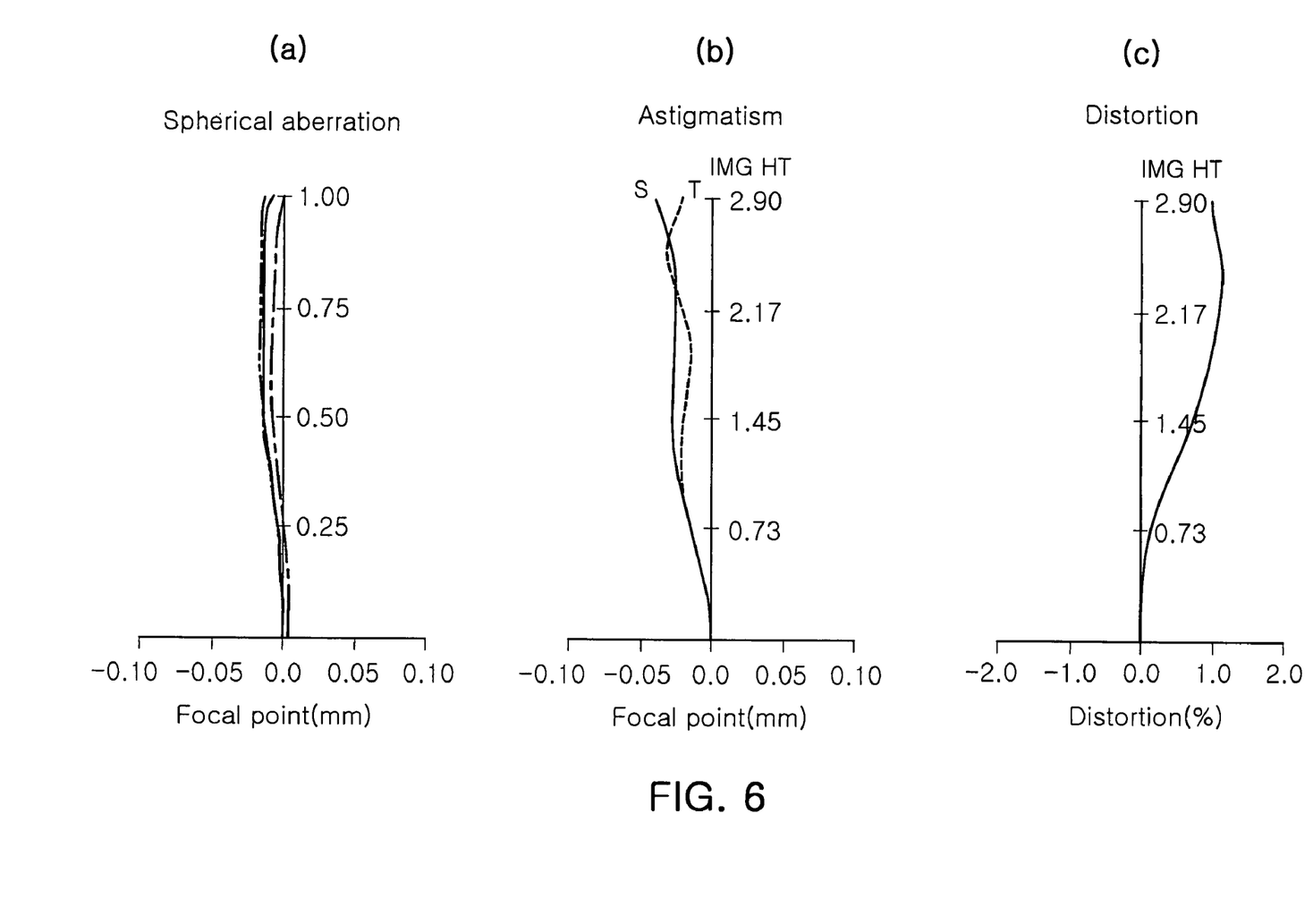
FIG. 6 is an aberrational diagram illustrating the embodiment shown in FIG. 5, in which A represents spherical aberration, B represents astigmatism and C represents distortion.

As can be seen from the above embodiments, the subminiature imaging optical system with excellent aberrational characteristics as shown in FIGS. 2 and 6 is obtained according to the present invention.

In the meantime, values of conditions 1 to 5 for the above first and second embodiments are noted in Table 5.

TABLE 5

|  | First embodiment | Second embodiment |
|---|---|---|
| Condition 1 | 27.38 | 23.42 |
| Condition 2 | 27.3 | 27.3 |

As noted in Table 5 above, the first and second embodiments of the present invention satisfy conditions 1 to 5.

As set forth above, according to exemplary embodiments of the invention, a subminiature imaging optical system is suitably applicable to subminiature optical instruments such as a mobile phone camera using an image sensor such as a CCD and CMOS. Moreover, lenses of the optical system are adjusted in radius of curvature, respectively and adopt an aspherical surface, thereby minimizing various aberrations and attaining an image with high resolution.

In addition, a number of lenses are formed of plastic to easily manufacture a lighter and lower-cost subminiature imaging optical system in mass production.

While the present invention has been shown and described in connection with the exemplary embodiments, it will be apparent to those skilled in the art that modifications and variations can be made without departing from the spirit and scope of the invention as defined by the appended claims.

What is claimed is:

1. A subminiature imaging optical system comprising:

an aperture stop; and four lenses, first, second, third and fourth lenses sequentially positioned from an object side to an image plane side, the first lens having positive refractivity, the second lens having a concave image-side surface and having negative refractivity, the third lens having negative refractivity, and the fourth lens having a concave image-side surface and positive refractivity, the second lens satisfies following condition 1, and the third lens satisfies following condition 2, $$20<V2<50 \qquad \text{condition 1,}$$

$$20<V3<30 \qquad \text{condition 2,}$$

where V2 is an Abbe number of the second lens and V3 is an Abbe number of the third lens, the four lenses are spatially separated from each other, the aperture stop is disposed in front of an object-side surface of the first lens, and at least one of respective surfaces of the first, third, and fourth lenses is formed of an aspherical surface.

2. The subminiature imaging optical system of claim 1, wherein the first, third and fourth lenses are formed of plastic and the second lens is formed of glass.

3. The subminiature imaging optical system of claim 1, wherein the first to fourth lenses are formed of plastic.

* * * * *